United States Patent [19]

Cieloszyk

[11] 4,410,649
[45] Oct. 18, 1983

[54] ETHYLENE POLYMER COMPOSITIONS HAVING IMPROVED TRANSPARENCY

[75] Inventor: Gary S. Cieloszyk, Somerville, N.J.

[73] Assignee: Union Carbide Corporation, Danbury, Conn.

[21] Appl. No.: 363,831

[22] Filed: Mar. 31, 1982

[51] Int. Cl.³ ............................................. C08L 5/00
[52] U.S. Cl. .................................. 524/108; 524/245; 524/247; 524/570; 524/579; 524/585; 524/587
[58] Field of Search ............... 524/108, 245, 247, 570, 524/579, 585, 587

[56] References Cited

U.S. PATENT DOCUMENTS

| 3,773,732 | 11/1973 | Dillenschneider | 526/335 |
|---|---|---|---|
| 3,773,743 | 11/1973 | Ainsworth et al. | 524/391 |
| 3,846,363 | 11/1974 | Ando et al. | 524/108 |
| 4,011,382 | 3/1977 | Levine et al. | 526/96 |
| 4,013,622 | 3/1977 | Dejuneas et al. | 524/388 |
| 4,016,118 | 4/1977 | Hamada et al. | 524/108 |
| 4,224,416 | 9/1980 | Taylor et al. | 524/585 |
| 4,243,762 | 1/1981 | McClain | 524/247 |
| 4,302,565 | 11/1981 | Goeke et al. | 526/88 |
| 4,302,566 | 11/1981 | Karol et al. | 526/125 |

FOREIGN PATENT DOCUMENTS 961998 1/1975 Canada .

*Primary Examiner*—Ronald W. Griffin
*Attorney, Agent, or Firm*—Clement J. Vicari

[57] ABSTRACT

The invention relates to an ethylene polymer plastic composition comprising a narrow molecular weight distribution ethylene polymer, a fatty acid amine and dibenzylidene sorbitol. A method is also provided for maintaining the effectiveness of dibenzylidene sorbitol when used to enhance the optical properties of polymer plastic compositions fabricated from resins produced using Ziegler type catalysts.

29 Claims, No Drawings

ETHYLENE POLYMER COMPOSITIONS HAVING IMPROVED TRANSPARENCY

BACKGROUND OF THE INVENTION

1. Field of the Invention

This invention relates to ethylene polymer plastic compositions useful for producing extruded or molded polyethylene products having improved transparency.

2. Description of the Prior Art

Polyolefin resins such as polyethylene have been used for a number of years for the preparation of products such as packaging materials and containers in the form of films, sheets or molded articles.

Unlike high-pressure low-density polyethylene, where the optical properties are governed primarily by rheological factors, the optical properties of narrow molecular weight distribution ethylene polymers are controlled primarily by crystallization effects, i.e., spherulite size. Heterogenous nucleating additives can improve ethylene polymers opticals by increasing the nucleation rate and hence the overall rate of crystallization, thereby generating smaller spherulites.

Heretofore extremely pure dibenzylidene sorbitol (DBS) (commercially known as EC-1 and available from EC-1 Chemicals Industries, Osaka, Japan or from Milliken Chemical Co., USA,) has been used as a nucleating agent to improve the optical properties of polyethylene products.

Thus, according to U.S. Pat. No. 4,016,118, issued to Kenzo Hamada et al on Apr. 5, 1977, there is provided a polyolefin plastic composition having improved transparency and reduced molding shrinkage, which consists essentially of at least one polymer or copolymer of an aliphatic monoolefin and dibenzlyidene sorbitol, the proportion of the dibenzylidene sorbitol being 0.1 to 0.7% by weight based on the total weight of the composition.

However, under some fabrication operations and conditions, even high levels of DBS may not improve the transparency (reduced haze) of Ziegler type catalyzed linear lower density polyethylene (LLDPE) since a critical concentration is required. Moreover, even in the case where DBS is effective, high concentrations are required. Since DBS is an expensive material, reduction of the concentrations needed to produce desired results is of commercial significance.

Moreover, the use of DBS to enhance the optical properties of LLDPE is not entirely satisfactory from a practical commercial standpoint since the effectiveness of DBS as a nucleating agent can be seriously impaired in the presence of the catalyst residues and/or by-products generated during the LLDPE resin-forming process or during the fabrication of the desired product.

Optical properties of extruded films produced from Ziegler-Natta catalyzed resins containing antioxidants can be improved with the addition of an acid acceptor to prevent surface distortions known as pin striping and gel streaking. The surface distortions are produced as a result of adverse interactions between catalyst residues and/or by-products, antioxidants and the resin.

Thus according to U.S. patent application Ser. No. 215,165 filed in the name of Michael A. Cowan and George N. Foster and assigned to a common assignee, the optical properties described above are improved by extruding a resin film forming composition which contains an antioxidant in the presence of an acid acceptor which reacts with the catalyst residue, the latter being suspected of cuasing optical degradation via the pin striping mechanism.

Other treatments disclosed in the prior art involve the addition of compounds to the polymer prior to fabrication in order to complex with the harmful components in the catalyst residue and deactivate them. Illustrative of these prior art treatments are those disclosed in Canadian Pat. No. 961,998, U.S. Pat. No. 4,013,622 and in U.S. Pat. No. 3,773,743. For example, U.S. Pat. No. 3,773,743 discloses a method for improving the stability and color of olefin polymers by deactivating their Ziegler-Natta catalyst residues. This method involves high temperature (190° C.–250° C.) processing with hydroxyl compounds ($H_2O$ and primary alcohols) and with an organic base such as an alkyl amine; aryl amine; Li, Ca and Zn salts of carboxylic acids; trialkyl phosphites; and metal alkoxides. The concentration disclosed for the hydroxy source is in the range of 0.5 to 1.5 weight percent and a concentration of 50 to 2500 parts per million (ppm) is disclosed for the organic base. At the processing temperatures disclosed, some of the organic bases and the hydroxy sources would be volatile and cause foaming of the product if the processing were not done in a way to remove volatiles.

However, as mentioned previously, in processing LLDPE resins, clarity in the final product is determined by crystallization factors of the composition and hence control of the formation of pinstripes and/or other surface defects (gel streaking) by the above prior art methods is independent and fundamentally different from the techniques described herein.

SUMMARY OF THE INVENTION

1. Objects of the Invention

An object of the present invention is to provide an ethylene polymer composition comprising a Ziegler-type catalyzed ethylene polymer, and extruded films and molded articles fabricated from such compositions which have excellent transparency with reduced haze.

Another object of the present invention is to provide a fatty acid amine compound as described hereafter to a Ziegler-type catalyzed ethylene polymer composition containing DBS wherein said acid amine compound maintains the effectiveness of the DBS in improving the clarity of the film and/or molded product produced from the composition.

Another object of the present invention is to generate improvement of opticals e.g., lower haze, at lower concentrations of DBS than those normally required for ethylene polymer plastic forming compositions.

A still further object of the present invention is an ethylene polymer plastic composition comprising LLDPE, DBS and a fatty acid amine which composition is eminently suitable for forming films or molded articles having a high degree of clarity.

2. Brief Summary of the Invention

This invention is based on the discovery that the beneficial effects of DBS in improving the optical properties of ethylene polymer compositions can be maintained during processing through the addition of relatively small amounts of a fatty acid amine such as N-N'diethanol stearyl amine to the ethylene polymer DBS composition prior to forming the finished article. As a result of the invention, the finished products, produced from said compositions whether they be in the form, of film or molded articles, have a relatively high degree of clarity.

In addition it has been discovered that the utilization of a fatty acid amine in relatively small amounts reduces the critical level of DBS normally required in ethylene polymer compositions to improve the clarity of the finished products produced from said compositions.

3. Description of the Preferred Embodiments

In one aspect, the present invention relates to an ethylene polymer plastic composition which, when molded or extruded, forms a film or article having good clarity, the composition comprising an ethylene polymer resin, DBS and a fatty acid amine. The ethylene polymer resin contains residues from a Ziegler-type catalyst used in its preparation.

In still another aspect the present invention, relates to a method of maintaining and enhancing the effectiveness of DBS when said DBS is utilized to enhance the optical properties of ethylene polymer forming compositions which method comprises adding a fatty acid amine to said composition in an amount sufficient to maintain and enhance the optical properties of films or articles formed from said composition.

The DBS can be added to the ethylene polymer and mixed by any suitable mixing means.

The fatty acid amine can be uniformly dispersed in the ethylene based extrusion composition. The dispersion can be effected by various dispersion techniques commonly employed by those skilled in the art of preparing extrudable compositions. The fatty acid amine can be introduced into the ethylene polymer containing DBS or along with DBS either by directly dry blending or by mixing via a Henschel type intensive mixer. The fatty acid amine and DBS can also be hot compounded directly into the ethylene polymer or into a base polymer to make a masterbatch for the final letdown using conventional hot processing equipment such as a Banbury mixer, a Werner Pfleider twin screw mixing extruder or a single screw mixer extruder that has pelletization equipment on the head of the extruder.

The dibenzylidene sorbitol (DBS) is a white powder having a melting point of 210° to 212° C. which is obtained by reacting 1 mole of d-sorbitol and 2 moles of benzaldehyde in the presence of an acid catalyst at an elevated temperature. It includes an isomer of the formula

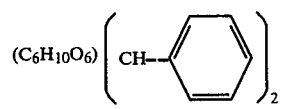

and is typically expressed by the following structural formula

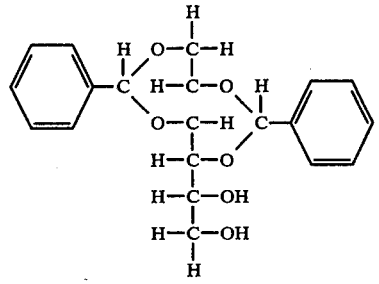

The dibenzylidene sorbitol obtained by the above method contains about 2% of by-product monobenzylidene sorbitol and tribenzylidene sorbitol. Although it is not always necessary to remove these impurities, the product is preferably purified so that the purity of the dibenzylidene sorbitol becomes 99.0 to 99.5% or more. The purification can be performed by recrystallization from dimethyl formamide.

The dibenzylidene sorbitol is also as indicated previously commercially available from EC-1 Chemical Industries, Osaka, Japan or from Milliken Chemical Co., U.S.A.

The proportion of the dibenzylidene sorbitol required in the composition of this invention is variable and depends upon such factors as intrinsic resin properties, temperatures experienced during processing, fabrication conditions and the amount of fatty acid amine used in the composition.

In general, the proportion of the dibenzylidene sorbitol in the composition of this invention is about 0.09% to 0.35% by weight, preferably about 0.12% to 0.25% by weight, based on the total weight of the composition. Amounts of dibenzylidene sorbitol in excess of about 0.35% by weight may be used, however, since the compound is expensive, the increased costs far outweigh any advantages.

The fatty acid amine can be represented by the formula:

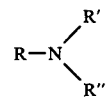

wherein
R is $C_{12-24}$ alkyl or alkylene;
R' is hydrogen, lower alkyl, an alkanol, 1,3-propylene diamine or an ethoxy group of the formula (C—C—O)$_x$H, wherein x is an integer between 2 and 5; and R" is R or R'

The fatty acid amine used in this invention is normally either liquid or solid at room temperature, has a molecular weight above the 180. Below molecular weights of 180, volatility becomes a problem, resulting in bloom on the surface of the film or causes plate-out or smoking on high temperature extrusion. This can adversely affect such properties as sealing, treatability and surface charteristics, in general. Increased volatility also can be manifested in foaming of the film extrudate and lensing in the blown film bubble.

Suitable fatty acid amines according to the present invention include a saturated fatty acid amine such as lauryl amine, mystearyl amine, palmityl amine, stearyl amine, arachidyl amine, behenyl amine and the like; a monounsaturated fatty acid amine such as oleyl amine and erucyl amine; a di-saturated fatty acid amine such as di-lauryl amine, di-mystearyl amine dipalmityl amine, di-stearyl amine, di-arachidyl amine, di-behenyl amine; a di-monounsaturated fatty acid amine such as di-oleyl amine and di-erucyl amine; a mixed saturated and mono-unsaturated fatty acid amine such as lauryl-oleyl amine, lauryl-stearyl amine, oleyl-erucyl amine and the like; lauryl, mystearyl, palmityl stearyl, arachidyl, behenyl, oleyl or erucyl—methanol, ethanol propanol or butanol amines; dimethanol, diethanol, dipropanol or dibutanol—lauryl, mystearyl, palmityl, stearyl, arachidyl, behenyl, oleyl or erucyl amines; dimethyl, diethyl, dipropyl or dibutyl—lauryl, mystearyl, palmityl, stearyl, arachidyl, behenyl, oleyl or erucyl amines; alkoxylated lauryl, mystearyl, palmityl, stearyl, arachidyl, behenyl, oleyl or erucyl amines derived using 2 to 10 mols of ethylene oxide, propylene oxide or butylene oxide; and N-lauryl, mystearyl, palmityl, stearyl, arachidyl, behenyl, oleyl, or erucyl—1,3 propylene diamine.

The preferred fatty acid amine is N-N' diethanol stearyl amine which is available commercially from Humko under the trade name Kemamine AS 990.

In general, the proportion of fatty acid amine in the composition of this invention is about 0.02% to 0.2% by weight preferably 0.03% to 0.1% of weight based on the total weight of the composition.

Ethylene Polymers

The copolymers which may be prepared in the process of the present invention are hydrocarbon copolymers of a major mol percent ($\geq 85\%$) of ethylene, and a minor mol percent ($\leq 15\%$) of one or more $C_3$ to $C_8$alpha olefins. The $C_3$ to $C_8$alpha olefins should not contain any branching on any of their carbon atoms which is closer than the fourth carbon atom. The preferred $C_3$ to $C_8$alpha olefins are propylene, butene-1, pentene-1 and hexene-1 and octene-1.

The ethylene polymers have a melt flow ratio of $\geq 22$ to $\leq 40$ and preferably of $\geq 25$ to $\leq 33$. The melt flow ratio value is another means of indicating the molecular weight distribution of a polymer. The melt flow ratio (MFR) range of $\geq 25$ to $\leq 33$ thus corresponds to a Mw/Mn value range of about 2.7 to 4.1. The polymers herein include a Mw/Mn value of the range of about 2.2 to 4.5. The melt index ranges from 0.1 to 100 gm/10 min.

The homopolymers have a density of about $\geq 0.960$ to $\leq 0.972$ and preferably of about $\geq 0.961$ to $\leq 0.968$.

The copolymers have a density of about $\geq 0.910$ to $\leq 0.960$ and preferably $\geq 0.915$ to $\leq 0.955$, and most preferably, of about $\geq 0.917$ to $\leq 0.945$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with a catalyst to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

The ethylene polymers of the present invention have an unsaturated group content of $\leq 1$, and usually $\geq 0.1$ to $\leq 0.35$, $C=C/1000$ carbon atoms. The ethylene polymers of the present invention are useful for making films and molded articles.

Also included in the term polymer are blends of one polymer with one or more other polymers. Illustrative of such blends are ethylene/olefinic polymers with one or more of the following: polypropylene, high pressure low-density polyethylene, high density polyethylene, polybutene-1, and molar monomer containing olefin copolymers such as ethylene/acrylic acid copolymers, etylene/methyl acrylate copolymer, ethylene/ethylacrylate copolymer, ethylene/vinyl acetate copolymer, ethylene/acrylic acid/ethyl acrylate terpolymer, ethylene/acrylic acid/vinyl acetate terpolymer, and the like.

Preferred low pressure, low density ethylene copolymers for use in the present invention include those which may be produced in accordance with the procedures set forth in U.S. patent application Ser. No. 892,325, filed Mar. 3, 1978, now abandoned, and refiled as Ser. No. 014,414 on Feb. 27, 1979, in the names of F. J. Karol et al. and entitled "Preparation of Ethylene Copolymers in Fluid Bed Reactor", now U.S. Pat. No. 4,302,566, issue Nov. 24, 1981, and the procedures set forth in U.S. patent application Ser. No. 892,322 filed Mar. 31, 1978, now abandoned, and refiled as Ser. No. 012,720 on Feb. 16, 1979, in the names of G. L. Goeke et al. and entitled "Impregnated Polymerization Catalyst, Process for Preparing, and Use for Ethylene Copolymerization", now U.S. Pat. No. 4,302,565, issued Nov. 24, 1981, as well as procedures which will produce ethylene hydrocarbon copolymers with properties as heretofore described. U.S. application Ser. No. 014,414 corresponds to European Patent Application No. 79100953.3 which was opened to the public on Oct. 17, 1979 as Publication No. 4646 and U.S. application Ser. No. 012,720 corresponds to European Patent Application No. 79100958.2 which was opened to the public on Oct. 27, 1979 as Publication No. 4647. The disclosures of Publication Nos. 4646 and 4647 are incorporated herein by reference.

Other low pressure, low density ethylene polymers preferred for use in the present invention are those which may be prepared as described in U.S. Pat. No. 4,011,382, entitled "Preparation of Low and Medium Density Ethylene Polymer in Fluid Bed Reactor" by I. J. Levine et al., the disclosure of which is incorporated herein by reference.

The ethylene polymers may be used in the form of powders, pellets, granules, or any other form that can be fed to an extruder.

Extrudable Compositions

The extrudable compositions of the invention may be used in any of the forms of such compositions which are commonly employed in the extruded film arts, such as compounds modified with various slip and anti-block additives for specific end use applications.

These extrudable compositions are thermoplastic in nature. In addition to the ethylene polymer, DBS and fatty acid amine, the compositions of the present invention may contain other adjuvant materials which are commonly employed in ethylene polymer-based extrudable compositions. Such other adjuvants would include plasticizers, fillers, pigments, lubricants, slip agents, antioxidents, stabilizers, modifiers and similar materials.

The fillers which may be used in the ethylene polymer-based extrudable compositions of the present invention are the fillers which are commonly used with such polymers. The fillers are used in amounts which corresponds to about 0.1 to 20 percent by weight, based on the weight of the olfein polymer. Such fillers would include materials such as clays, diatomaceous earth, calcium silicates and others known in the art.

The plasticizers which may be employed in the ethylene polymer-based extrudable compositions of the present invention are the plasticizers which are commonly used with such polymers. The plasticizers are used in amounts which would correspond to about 1 to 25 percent weight based on the weight of ethylene polymer. Such plasticizers would include material such as phtalates, phosphates, adipates, azelates, amine based polyols, and a number of other similar products.

The lubricants which are commonly employed in the ethylene polymer-based extrudable compositions are the lubricants which are commonly used with such polymers. The lubricants are used in amounts which correspond to about 0.01 to 0.2 percent by weight of lubricant agent based on the weight of the ethylene polymer. Examples of such lubricants are fatty acid amides such as stearamide, oleamide, behenamide and erucamide.

Extruding Conditions

Film

The films produced by the compositions of the present invention may be extruded by tubular blown film extrusion such as disclosed in U.S. Pat. No. 4,243,619 issued Jan. 6, 1981. In the patent process a molten, narrow molecular weight distribution ethylene hydrocarbon copolymer is extruded through an annular die having a die gap of greater than about 50 mils to less than about 120 mils, preferably greater than about 50 mils to less than about 100 mils. The copolymer is extruded at a temperature of about 325° F to about 500° F., and is extruded in an upward vertical direction in the form of a tube although it can be extruded downward or even sideways. After extrusion of the molten polymer through the annular die, the tubular film is expanded to the desired extent, cooled, or allowed to cool and flattened. The tubular film is flattened by passing the film through a collapsing frame and a set of nip rolls. These nip rolls are driven, thereby providing means for withdrawing the tubular film away from the annular die.

A positive pressure of gas, for example, air or nitrogen, is maintained inside the tubular bubble. As is known in the operation of conventional film processes, the pressure of the gas is controlled to give the desired degree of expansion of the tubular film. The degree of expansion, as measured by the ratio of the fully expanded tube circumference to the circumference of the die annulus, is in the range 1/1 to 6/1 and preferably, 1/1 to 4/1.

As the ethylene hydrocarbon copolymer exists the annular die, the extrudate cools and its temperature falls below its melting point and it solidifies. The optical properties of the extrudate change as crystallization occurs and a frost line is formed. The position of this forst line above the annular die is a measure of the cooling rate of the copolymer film. This cooling rate has a very marked effect on the optical properties of the ethylene hydrocarbon copolymer film produced herein. Crystallization effects, as discussed previously, dominate the optical properties of the ethylene polymer films described herein. Blown film process parameters have a very pronounced effect on the optical properties of these films.

The films produced by the composition of the present invention are usually prepared in tubing or sheeting which are about 0.1 to 10 mils thick.

MOLDED ARTICLES

The articles produced from the composition of the present invention are prepared by methods well known in the art, such as by injection molding, rotomolding and blow molding.

Articles such as lids, closures, food or garbage containers, dishpans and toys are produced by ram or screw injection molding processes well known in the art. For example, Renfrew & Morgan, "Polyetylene," second edition, Interscience Publisher, (1960) pages 549–570 describes injection molding of polyethylene. The articles of the present invention are molded in a standard injection molding machine where the ethylene polymer is heated at a temperature of from about 180° to 270° C. in the machine until plasticized and is then injected at a gauge pressure of from about 500 to about 2000 psi into a mold cavity of desired configuration. The ethylene polymer is cooled in the mold cavity at temperatures of from about 15° to about 60° C. until it conforms to the shape of the mold cavity. The molded article is then removed from the mold.

Articles such as bottles and containers are molded by injection or extrusion blow molding processes which are well known in the prior art. For example, Renfrow & Morgan, supra, pages 571 to 579, described blow molding of polyethylene. In blow molding, the ethylene polymer is heated as previously described in the machine and the resin is then injected into a mold cavity kept a temperature near the melting point of the resin preferably from about 80° to about 130° C. and formed into a tubular shape called a parison which is then transferred to another cooler mold of desired shape and forced under air pressure against the walls of the mold cavity and cooled. The article is then removed from the mold.

Extrusion blow molding consists of, for example, extruding a length of tube of the ethylene polymer into a split mold which is then closed to seal the tube at either top or bottom. The tube is then inflated to the internal contour of the mold, for example, by air pressure introduced into the extrudate. The molding is then cooled, the mold opened and the component ejected.

Articles such as large toys and industrial size food and garbage containers are principally made by rotomolding instead of injection molding, because of the intricate shapes involved and the superior economics the process offers for low volume production.

The process of rotomolding is well known in the art and is described in "Encyclopedia of Polymer Science and Technology," Volume 9, Interscience Publisher, 1968, pages 118–137.

In this process either powdered resin or fine resin particles are placed into the metal mold cavity which is then rotated in a hot oven (500° to 600° F.) until the resin melts and coats the inside of the mold cavity. The metal mold containing the molten resin is then transferred to a cooling means wherein it is cooled until the molten resin has solidified and conformed to the shape of the mold cavity.

Before processing according to the methods heretofore described, the ethylene polymer can be mixed or blended with various additives and then added to the molding machine or the ethylene polymer can be added directly to the molding machine together with any additives.

The shape of molded articles from ethylene polymer include lids, closures, food and garbage containers, dishpans, bottles, toys, hinges, etc.

Properties of Ethylene Polymers, Films and Articles

The properties of the ethylene polymers, film and articles produced therefrom, were determined by the following methods:

| | |
|---|---|
| Density | ASTM D-1505 - Plaque is conditioned for one hour at 100° C. to approach equilibrium crystallinity - reported as gms/cm 3 |
| Melt Index (MI) | ASTM D-1238 - Condition E - measured at 190° C. - reported as grams per 10 minutes. |
| Flow Index (HLMI) | ASTM D-1238 - Condition F measured at 10 times the weight used in the melt index test above - reported as grams per 10 minutes. |
| Melt Flow Ratio (MFR) | Flow Index/Melt Index. |
| Molecular Weight Distribution Mw/Mn | Gel Permeation Chromatography styragel column packaging, pore size packing sequence is $10^7$, $10^5$, $10^4$, $10^3$, 60A°; solvent: Perchlorethylene at 117° C. Detection: Infrared at 3.45 m. |
| Haze | ASTM D-1003-61 - Percentage of transmitted light scattered more than 2.5° from the normal incident beam. Reported as percent haze. |
| 45° Specular Gloss (Dull) | ASTM D-2457-70. Gloss measurements were made using a Gardner Model UX-6 glossmeter. 45° specular gloss is the relative luminous fractional reflectance of a film specimen where the incident beam is 45° off the normal and, the receptor is at the mirror reflection of the axis of the incident beam. |

The following examples are illustrative of the present invention and are not included as a limitation of the scope thereof.

EXAMPLE 1

Preparation of Polymer Resins

A. Three low pressure, low density ethylene-butene-1 copolymer resins were prepared according to the procedure disclosed in South African Patent Publication No. 79-01365, published Sept. 22, 1980, entitled "Process for Making Film From Low-Density Ethylene Hydrocarbon Copolymer" by W. A. Fraser et al. The properties of the ethylene-butene-1 copolymer resins were determined by methods disclosed previously.

One of the ethylene-butene-1 copolymer resins, designated (1), had the following properties: a melt index of 1.0; a MFR of 26; a density of 0.918 gm/cm$^3$; and a catalyst residue in ppm of Ti-2, Al-73, Si-56 and Cl-13.

The second ethylene-butene-1 copolymer resin, designated (2), had the following properties: a melt index of 2.0; a MFR of 28; a density of 0.918 gm/cm$^3$; and a catalyst residue in ppm of Ti-3, Al-80, Si-97 and Cl-16.

The third ethylene-butene-1 copolymer resin (3) had the following properties: a melt index of 50; a MFR of 26; a density of 0.926 gm/cm$^3$; and a catalyst residue in PPM of Ti-3, Al-89, Si-56 and Cl-13.

B. A low pressure high density ethylene homopolymer resin designated as (4) was prepared according to the procedure disclosed in U.S. Pat. No. 4,303,771 issued on Dec. 1, 1981. The properties of the homopolymers were determined by the methods described previously.

The homopolymer resin had the following properties: a melt index of 7; a MFR of 26; a density of 0.967 gm/cm$^3$; and a catalyst residue in ppm of Ti 4, Al 60, Si-100, and Cl-45.

Resin A or resin B was used in the resin compositions of all the subsequent examples herein.

EXAMPLES 2-19

An ethylene-butene-1, 2MI, density 0.918 gm/cm$^3$ copolymer prepared as in Example 1, and designated (2) was compounded using a small Brabender mixer with dibenzylidene sorbitol (DBS) and co-ingredients under a five minute mixing cycle at 150° and 210° C. All ingredients were simultaneously added and compounded in the 40 gram Brabender. The compounded products were subsequently compression molded into plaques (4"×4", 20 mils) at 170, 190 and 220° C., respectively. The following formulations were investigated: ethylene-butene-1 copolymer plus 1400 ppm dibenzylidene sorbitol; ethylene-butene-1 copolymer plus 1400 ppm dibenzylidene sorbitol plus 3000 ppm diatomaceous earth; ethylene-butene-1 copolymer plus 1400 ppm dibenzylidene sorbitol plus N,N-diethanol-stearyl amine. The appearance and the haze of the plaques were recorded. The data is summarized in Table I. With the addition of 500 ppm N,N'diethanol-stearyl amine higher clarity, low haze plaques were produced under most mixing and molding conditions.

TABLE I

| Example | Composition | $T$Mix (°C.)[1] | $T$mold (°C.)[2] | Appearance[3] | Haze (%)[3] |
|---|---|---|---|---|---|
| 2 | Low density PE resin + | 150 | 170 | Hazy (partial) | 60.8 |
| 3 | 1400 ppm DBS | " | 190 | Hazy | 60.0 |
| 4 | | " | 220 | Hazy | 67.2 |
| 5 | Low density PE resin + | 210 | 170 | Hazy | 64.0 |
| 6 | 1400 ppm DBS | " | 190 | Hazy | 65.9 |
| 7 | | " | 220 | Hazy | 70.7 |
| 8 | Low density PE resin + | 150 | 170 | Clear | 33.7 |
| 9 | 1400 ppm DBS + | " | 190 | Hazy (partial) | 40.2 |
| 10 | 3000 ppm AB (antiblock) | " | 220 | Hazy (almost total) | 56.6 |
| 11 | Low density PE resin + | 210 | 170 | Hazy | 65.3 |
| 12 | 1400 ppm DBS + | " | 190 | Hazy | 66.9 |
| 13 | 3000 ppm AB (antiblock) | " | 220 | Hazy | 68.6 |
| 14 | Low density PE resin + | 150 | 170 | Clear | 28.6 |
| 15 | 1400 ppm DBS + | " | 190 | Clear | 26.7 |

TABLE I-continued

| Example | Composition | $T_{Mix}$ (°C.)[1] | $T_{mold}$ (°C.)[2] | Appearance[3] | Haze (%)[3] |
|---|---|---|---|---|---|
| 16 | 500 ppm N,N' diethanol-stearyl amine | " | 220 | Clear | 24.7 |
| 17 | Low density PE resin + | 210 | 170 | Clear | 36.9 |
| 18 | 1400 ppm DBS + | " | 190 | Hazy (partial) | 48.7 |
| 19 | 500 ppm N,N' diethanol-stearyl amine | " | 220 | Hazy (partial) | 42.2 |

[1]Brabender mixing temperatures.
[2]Compression molding plaque temperatures.
[3]Based on 20 mil plaques.

EXAMPLE 20-24

An ethylene butene-1 copolymer prepared as in Example 1, having a melt index of 2.0 grams/10 min. and density of 0.918 grams/cm³ designated (2) and containing approximately 200 ppm of Irganox 1076 as a storage stabilizer was dryblended with a masterbatch containing DBS or a masterbatch containing both DBS and N,N' diethanol stearyl amine. Both masterbatches were produced using a 6.0 lb. Banbury with 2.0 MI 0.918 density ethylene-butene-1 copolymer as the base masterbatch resin. The first masterbatch contained 4.0% DBS, while the second masterbatch contained 4.0 wt.% DBS and 1.1 wt.% N,N'diethanol-stearyl amine. Dryblends of the base resin and granulated masterbatches were produced at 3.5 and 5.0% letdown, respectively. The dryblends were subsequently fabricated into tubular films using a 24:1 L/D, 1½ inch Sterling extruder fitted with a standard 24:1 L/D PE mixing screw. The die was a 3 inch Sano spiral pin configuration with an enlarged (60 mil) die gap. Films were produced at an 8-9 inch frostline height at 50 RPM (25 lbs/hr) at 1.5 mil gauge, 3:1 BUR from the standard ethylene-butene-1 copolymer (control) and blends with 3.5 and 5.0 wt% of the DBS and DBS plus N,N'dethanol-stearyl amine masterbatches.

Table II illustrates the final composition and subsequent haze and 45° Dull gloss of the film. As illustrated in Examples 21 and 23, DBS by itself can have under certain conditions a detrimental or negibile effect on the film opticals of said ethylene-buteine-1 copolymer film relative to the control Example 20.

Examples 22 and 24 illustrate that low levels of N,N'diethanol-stearyl amine in combination with DBS will generate a dramatic improvement in the film opticals of said ethylene-butene-1 copolymer films.

TABLE II

| Example No. | FILM FORMULATION | | | Haze (%) | Gloss (45° Dull) |
|---|---|---|---|---|---|
| | Masterbatch (%) | DBS (ppm) | N,N'diethanol-stearyl amine (ppm) | | |
| 20 | 0 | 0 | 0 | 16.2 | 39.4 |
| 21 | 3.5 | 1400 | 0 | 20.7 | 33.7 |
| 22 | 3.5 | 1400 | 390 | 4.1 | 85.4 |
| 23 | 5.0 | 2000 | 0 | 17.6 | 35.5 |
| 24 | 5.0 | 2000 | 550 | 3.2 | 81.1 |

EXAMPLES 25-29

An ethylene butene-1 copolymer prepared as in Example 1, having a melt index of 1.0 grams/10 min. and density of 0.918 grams/cm³ designated (1) and containing approximately 200 ppm of Irganox 1076 as a storage stabilizer was dryblended with a masterbatch containing DBS or a masterbatch containing both DBS and N,N' diethanol stearyl amine. Both masterbatches were produced using a 6.0 lb. Banbury with a 2.0 MI, 0.918 density ethylene-butene-1 copolymer as the base masterbatch resin. The first masterbatch contained 4.0% DBS, while the second masterbatch contained 4.0 wt.% DBS and 1.1 wt.% N,N'diethanol-stearyl amine. Dryblends of the base resin and granulated masterbatches were produced at 3.5 and 5.0% letdown, respectively. The dryblends were subsequently fabricated into tubular films using a 24:1 L/D, 1½ inch Sterling extruder fitted with a standard 24:1 L/D polyethylene mixing screw. The die was a 3-inch Sano spiral pin configuration with an enlarged (60 mil) die gap. Films were produced at an 8-9 inch frostline height at 50 RPM (25 lbs/hr) at 1.5 mil gauge, 3:1 BUR from the standard ethylene-butene-1 copolymer (control) and blends with 3.5 and 5.0 wt% of the DBS and DBS plus N,N'diethanol-stearyl amine masterbatches.

Table III illustrates the final composition and subsequent haze and 45° Dull gloss of the film. As illustrated in Examples 26 and 28, DBS by itself can have under certain conditions a detrimental effect on the films opticals of said ethylene-butene and copolymer film relative to the control, Example 25.

Examples 27 and 29 illustrate that low levels of N,N'diethanol-stearyl amine in combination with DBS will generate a dramatic improvement in the film opticals of said ethylene-butene-1 copolymer films.

TABLE III

| Example No. | FILM FORMULATION | | | Haze (%) | Gloss (45° Dull) |
|---|---|---|---|---|---|
| | Masterbatch (%) | DBS (ppm) | N,N'diethanol-stearyl amine (ppm) | | |
| 25 | 0 | 0 | 0 | 9.7 | 59.2 |
| 26 | 3.5 | 1400 | 0 | 17.8 | 40.2 |
| 27 | 3.5 | 1400 | 390 | 4.7 | 83.8 |
| 28 | 5.0 | 2000 | 0 | 18.1 | 38.9 |
| 29 | 5.0 | 2000 | 550 | 5.7 | 80.6 |

EXAMPLES 30-33

An ethylene-butene-1, 2MI, 0.918 gms/cm³ density copolymer designated (2) prepared as in Example 1, was compounded using a small Brabender mixer with dibenzylidene sorbitol (DBS) and co-ingredients under a five minute mixing cycle at 150° C. The very low levels of DBS (30 ppm) were added via a masterbatch. All ingredients were then simultaneously compounded. The compounded products were subsequently compression molded into plaques (4×4 inch, 20 mils) at 150° and 220° C., respectively. The following formulations were investigated: ethylene-butene-1 copolymer with 30 ppm DBS, and ethylene butene-1 copolymer with 30 ppm DBS and 500 ppm N,N'diethanol-stearyl amine. The appearance and haze of the plaques were recorded. The data are summarized in Table IV and indicate that 500 ppm of N,N'diethanol-stearyl amine alone does not reduce the haze of compression molded low density plaques vis-a-vis a control (Examples 30, 31 vs. 32, 33).

TABLE IV

| Example No. | Composition | $T_{mix}$ (°C.) | $T_{mold}$ (°C.) | Appearance | Haze (°C.) |
|---|---|---|---|---|---|
| 30 | Low density PE + | 150 | 150 | hazy | 63.7 |
| 31 | 30 ppm DBS | | 220 | hazy | 73.1 |
| 32 | Low density PE + | 150 | 150 | hazy | 65.5 |
| 33 | 30 ppm DBS + 550 ppm N,N'diethanol stearyl amine | | 220 | hazy | 68.4 |

EXAMPLES 34-36

An ethylene butene-1, 50 MI, 0.926 density copolymer designated (3) prepared as in Example 1, was compounded with dibenzylidene sorbitol (DBS) and co-ingredients using a Prodex compounding extruder. An unmodified control, also compounded under the same conditions served as the control. The formulations (see Table V) were then injection molded at 430° F. into 603 lid samples. The specimen thicknesses were approximately 27-30 mils. The appearance and the haze of the lids were recorded. The data is summarized in Table V and indicates that DBS combined with N,N'diethanol-stearyl amine dramatically reduces the haze, once a critical levels of DBS is achieved. The critical concentration of DBS can be affected by fabrication conditions.

TABLE V

| Example No. | Composition | Appearance | Haze (%) |
|---|---|---|---|
| 34 | 50 MI low density PE | hazy | 94.1 |
| 35 | 50 MI low density PE + 1400 ppm DBS + 500 ppm N,N'diethanol stearyl amine | hazy | 92.2 |
| 36 | 50 MI low density PE + 1800 ppm DBS + 500 ppm N,N'diethanol stearyl amine | clear | 57.6 |

EXAMPLES 37-54

A high density ethylene homopolymer at 0.967 density and 7MI, MFR 25 designated as (4) was compounded using a small Brabender mixer with dibenzylidene sorbitol (DBS) and co-ingredients under a five minute mixing cycle at 170°, 190° and 220° C. All ingredients were simultaneously added and comounded in the 40 gram capacity Brabender. The compounded products were subsequently compression molded into plaques (4×4 in.×20 mil) at 170°, 190° and 220° C., respectively. The following formulations were investigated: high density narrow molecular weight distribution ethylene homopolymer containing 2200 ppm DBS and a high-density narrow molecular weight distribution ethylene homopolymer containing 2200 ppm DBS and 600 ppm N,N'diethanol-stearyl amine. The appearance and the haze of the plaques were recorded. The data is summarized in Table VI.

As demonstrated in Table VI, 2200 ppm alone of DBS can under certain mixing and molding conditions generate clearer high density plaques (see Example 38, 43) compared to a control without DBS. However, the incorporation of 600 ppm N,N'diethanol-stearyl amine with the 2200 ppm DBS generated clearer plaques under a greater set of mixing and molding conditions. (see Examples 47, 48, 50, 51 and 52 vs 38, 43).

TABLE VI

| Example No. | Composition | $T_{mix}$ (°C.) | $T_{mold}$ (°C.) | Plaque Appearance | Plaque Haze (°C.) |
|---|---|---|---|---|---|
| 37 | high density polyethylene + | 170 | 170 | almost clear | 64.4 |
| 38 | 2200 ppm DBS | | 190 | clear | 60.6 |
| 39 | ↓ | | 220 | almost clear | 64.1 |
| 40 | ↓ | 190 | 170 | almost clear | 63.6 |
| 41 | ↓ | | 190 | hazy | 64.3 |
| 42 | ↓ | | 220 | hazy | 65.6 |
| 43 | ↓ | 220 | 170 | clear | 59.7 |
| 44 | ↓ | | 190 | hazy | 67.7 |
| 45 | ↓ | | 220 | hazy | 71.6 |
| 46 | high density polyethylene + | 170 | 170 | almost clear | 62.6 |
| 47 | 2200 ppm DBS + | | 190 | clear | 57.6 |
| 48 | 600 ppm N,N'diethanol-stearyl amine | | 220 | clear | 57.8 |
| 49 | ↓ | 190 | 170 | almost clear | 63.3 |
| 50 | ↓ | | 190 | clear | 57.4 |
| 51 | ↓ | | 220 | clear | 60.0 |
| 52 | ↓ | 220 | 170 | clear | 61.8 |
| 53 | ↓ | | 190 | hazy | 68.2 |
| 54 | ↓ | | 220 | hazy | 67.5 |

EXAMPLE 55, 56

A Differential Scanning Calorimetry (DSC) crystallization time measurement was used to determine the magnitude of the reduction in the concentration of DBS required to produce improve clarity with the addition of N,N'diethanol-stearyl amine to said ethylene polymer. The technique measures the time taken for a resin melt to reach maximum crystallization rate under a given degree of supercooling. Increasing the degree of supercooling decreases the crystallization time. If one tries to crystallize a polymer near its melting point (small degree of supercooling), the crystallization time becomes exceedingly long. Using the DSC, a small specimen is heated at 10°/minute up to 150° C., held at that temperature (maximum DSC temperature) to ensure complete relaxation of any stress and then cooled at 160° C./min to the desired crystallization temperature. Since the DSC is a very sensitive calorimeter, it can precisely monitor the energy liberated during the crystallization process. The time taken to reach the maximum crystallization rate is designated the crystallization time (Time$_c$).

Various concentration of DBS ranging from 30 ppm to 2000 ppm were compounded with an ethylene butene-1 copolymer, 2 MI 0.918 density designated as (2) using a small Brabender at 150° C. and analyzed via the DSC crystallization time technique. In addition, various concentrations of DBS ranging from 30 ppm to 2000 ppm with 500 ppm N,N'diethanol-stearyl amine in the 2 MI 0.918 density ethylene butene-1 copolymer were also studied. The maximum DSC temperature were set at 150° C. and 220° C. respectively to simulate the effect of higher temperatures on the crystallization time. We have found that when the crystallization time is below 125 seconds at 116° C. crystallization temperature, clear compression molded plaque will be produced if the compression molding temperature equals the maximum DSC temperature.

As indicated in Table VII temperature has a dramatic effect on the effectiveness of DBS. At higher temperatures, higher concentrations of DBS are required. However, with the addition of N,N'-diethanol-stearyl amine lower levels of DBS can be used to generate improved clarity.

TABLE VII

| Example | Composition | DBS CRITICAL CONCENTRATION (PPM) AT: | |
|---|---|---|---|
| | | 150° C. | 220° C. |
| 55 | Low density PE resin + DBS | 950 | 2000 |
| 56 | Low density PE resin + DBS + 500 ppm N,N'—diethanol-stearyl amine | 850 | 1200 |

What is claimed is:

1. An ethylene polymer plastic composition having improved optical properties which comprises a narrow molecular weight distribution, ethylene polymer resin, from about 0.09% to about 0.35% by weight based on the total weight of the composition of dibenzylidene sorbitol and from about 0.02% to 0.2% by weight based on the total weight of the composition of a fatty acid amine of the formula:

wherein
R is C$_{12}$–C$_{24}$ alkyl or alkylene;
R' is hydrogen, lower alkyl, alkanol, 1,3-propylene diamine or an ethoxy group of the formula: (C—C—O)$_x$H wherein x is an integer between 2 and 5; and
R" is R or R'.

2. A composition according to claim 1 wherein said fatty acid amine is N-N' diethanol stearyl amine, N-N' diethanol lauryl amine, N-N' diethanol behenyl amine, or combination thereof.

3. A composition according to claim 1 wherein said fatty acid amine is N-N' diethanol stearyl amine.

4. A composition according to claim 1 wherein said ethylene polymer has a melt index of 0.1 to 100 gms/10min, and a density of about 0.910 to about 0.972.

5. A composition according to claim 1 wherein the ethylene polymer is a low density ethylene hydrocarbon copolymer.

6. A composition according to claim 5 wherein said copolymer is a copolymer of ethylene and at least one C$_3$ to C$_8$ alpha olefin.

7. A composition according to claim 6 wherein said copolymer is an ethylene-butene-1 copolymer.

8. A composition according to claim 1 wherein said dibenzylidene sorbitol is present in said composition in an amount of about 0.12% to 0.25% by weight based on the weight of the composition and wherein said fatty acid amine is present in said composition in an amount of about 0.03% to 0.1% by weight based on the weight of the composition.

9. A composition according to claim 8 wherein said fatty acid amine is N-N' diethanol stearyl amine, N-N' diethanol lauryl amine, N-N' diethanol behenyl amine, or combinations thereof.

10. A composition according to claim 8 wherein said fatty acid amine is N-N' diethanol stearyl amine.

11. A composition according to claim 8 wherein said ethylene polymer has a melt index of 0.1 to 100 gms/10 min, and a density of about 0.910 to about 0.972.

12. A composition according to claim 8 wherein the ethylene polymer is a low density ethylene hydrocarbon copolymer.

13. A composition according to claim 12 wherein said copolymer is a copolymer of ethylene and at least one C$_3$ to C$_8$ alpha olefin.

14. A composition according to claim 13 wherein said copolymer is an ethylene-butene-1 copolymer.

15. A method of maintaining the effectiveness of dibenzylidene sorbitol when it is added to ethylene polymer plastic forming compositions to enhance the optical properties of ethylene polymer plastic compositions which comprises incorporating in said plastic forming compositions containing from about 0.02% to 0.2% based on the total weight of the composition of dibenzylidene sorbitol, a fatty acid amine of the formula:

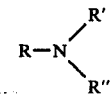

wherein
R is C$_{12}$—C$_{24}$ alkyl or alkylene;
R' is hydrogen, lower alkyl, alkanol, 1,3-propylene diamine or an ethoxy group of the formula: (C—C—O)$_x$ H wherein x is an integer between 2 and 5; and
R" is R or R'
said fatty acid amine being incorporated in said composition in an amount of about 0.02% to 0.2% by weight based on the total weight of the composition.

16. A method according to claim 15 wherein said fatty acid amine is N-N' diethanol stearyl amine, N-N'-diethanol lauryl amine, N-N' diethanol behenyl amine, or combinations thereof.

17. A method according to claim 15 wherein said fatty acid amine is N-N' diethanol stearyl amine.

18. A method according to claim 15 wherein said ethylene polymer has a melt index of 0.1 to 100 gms/10min, and a density of about 0.910 to about 0.972.

19. A method according to claim 15 wherein the ethylene polymer is a low density ethylene hydrocarbon copolymer.

20. A method according to claim 19 wherein said copolymer is a copolymer of ethylene and at least one $C_3$ to $C_8$ alpha olefin.

21. A method according to claim 20 wherein said copolymer is an ethylene-butene-1 copolymer.

22. A method according to claim 15 wherein said dibenzylidene sorbitol is present in said composition in an amount of about 0.12% to 0.25% by weight based on the weight of the composition and wherein said fatty acid amine is present in said composition in an amount of about 0.03% to 0.1% by weight based on the weight of the composition.

23. A method according to claim 22 wherein said fatty acid amine is N-N' diethanol stearyl amine, N-N' diethanol lauryl amine, N-N' diethanol behenyl amine, or combinations thereof.

24. A method according to claim 23 wherein said fatty acid amine is N-N' diethanol stearyl amine.

25. A method according to claim 22 wherein said ethylene polymer has a melt index of 0.1 to 100 gms/10 min, and a density of about 0.910 to about 0.972.

26. A method according to claim 22 wherein the ethylene polymer is a low density ethylene hydrocarbon copolymer.

27. A method according to claim 26 wherein said copolymer is a copolymer of ethylene and at least one $C_3$ to $C_8$ alpha olefin.

28. A method according to claim 26 wherein said copolymer is an ethylene-butene-1 copolymer.

29. Films produced from the composition of claim 1.

* * * * *